United States Patent
Murata et al.

(10) Patent No.: US 7,760,260 B2
(45) Date of Patent: Jul. 20, 2010

(54) SOLID STATE IMAGING APPARATUS, METHOD FOR DRIVING THE SAME AND CAMERA USING THE SAME

(75) Inventors: Takahiko Murata, Osaka (JP); Takumi Yamaguti, Kyoto (JP); Toshiya Fujii, Shiga (JP); Shigetaka Kasuga, Osaka (JP)

(73) Assignee: Panasonic Corporation, Osaka (JP)

( * ) Notice: Subject to any disclaimer, the term of this patent is extended or adjusted under 35 U.S.C. 154(b) by 933 days.

(21) Appl. No.: 10/759,570

(22) Filed: Jan. 20, 2004

(65) Prior Publication Data

US 2004/0145666 A1      Jul. 29, 2004

(30) Foreign Application Priority Data

Jan. 28, 2003 (JP) .............................. 2003-018142
Jul. 30, 2003 (JP) .............................. 2003-283116

(51) Int. Cl.
*H04N 3/14* (2006.01)
*H04N 5/335* (2006.01)
*H04N 9/083* (2006.01)
*H04N 9/04* (2006.01)

(52) U.S. Cl. ..................... 348/304; 348/281; 348/283

(58) Field of Classification Search ................. 348/272, 348/273, 281, 283, 295, 302, 303, 304, 311, 348/315, 316, 317, 319, 320, 321, 322, 323, 348/324

See application file for complete search history.

(56) References Cited

U.S. PATENT DOCUMENTS

| | | | | |
|---|---|---|---|---|
| 4,553,159 A | * | 11/1985 | Moraillon | 348/280 |
| 5,016,108 A | * | 5/1991 | Akimoto et al. | 348/302 |
| 5,440,343 A | * | 8/1995 | Parulski et al. | 348/316 |
| 6,124,888 A | * | 9/2000 | Terada et al. | 348/302 |
| 6,377,304 B1 | * | 4/2002 | Saitoh | 348/308 |
| 6,486,911 B1 | * | 11/2002 | Denyer et al. | 348/308 |
| 6,992,714 B1 | | 1/2006 | Hashimoto et al. | |
| 2002/0145669 A1 | * | 10/2002 | Umeda et al. | 348/220.1 |
| 2004/0085475 A1 | * | 5/2004 | Skow et al. | 348/362 |

FOREIGN PATENT DOCUMENTS

JP        3-29474    *    2/1991

(Continued)

OTHER PUBLICATIONS

Japanese Office Action issued in corresponding Japanese Patent Application No. JP 2003-432563, dated Jan. 16, 2007.

(Continued)

*Primary Examiner*—Sinh Tran
*Assistant Examiner*—Albert H Cutler
(74) *Attorney, Agent, or Firm*—McDermott Will & Emery LLP

(57) ABSTRACT

A solid state imaging apparatus which includes a plurality of pixels two-dimensionally arranged in the vertical direction and the horizontal direction and every two vertically or horizontally adjacent ones of the plurality of pixels have color filters of different colors. In a predetermined period of time, charge signals received from ones of the plurality of pixels arranged in the vertical direction or the horizontal direction which include color filters of the same color (represented by circles) are sequentially output.

13 Claims, 12 Drawing Sheets

FOREIGN PATENT DOCUMENTS

| | | |
|---|---|---|
| JP | 6-121324 | 4/1994 |
| JP | 6-311432 | 11/1994 |
| JP | 08-154253 | 6/1996 |
| JP | 08-154253 * | 11/1996 |
| JP | 11-146280 | 5/1999 |
| JP | 2000-308075 | 11/2000 |
| JP | 2001-036920 | 2/2001 |
| JP | P2001-292453 A | 10/2001 |
| JP | 2002-165136 | 6/2002 |
| JP | 2002-165225 | 6/2002 |
| JP | P2002-314882 A | 10/2002 |

OTHER PUBLICATIONS

Japanese Office Action, with English translation, issued in Japanese Patent Application No. 2007-058167, mailed Mar. 23, 2010.

* cited by examiner

SOLID STATE IMAGING APPARATUS, METHOD FOR DRIVING THE SAME AND CAMERA USING THE SAME

BACKGROUND OF THE INVENTION

The present invention relates a solid state imaging apparatus which includes a plurality of pixels two-dimensionally arranged in the vertical direction and the horizontal direction, every two vertically or horizontally adjacent ones of the plurality of pixels including color filters of different colors, respectively.

(First Known Example)

In recent years, as an exemplary solid state imaging apparatus, for example, a apparatus shown in FIG. 10 has been known (see Japanese Patent Publication No. 2001-292453).

Hereinafter, the known solid state imaging apparatus described in the above-described publication will be described with reference to FIG. 10.

In FIG. 10, the reference numeral 201 denotes a set of a plurality of pixels arranged in a matrix, the reference numeral 202 denotes a pixel unit consisting of four pixels arranged in two rows and two columns, the reference numeral 203 denotes a first pixel mixture unit consisting of a plurality of pixels which form a first pixel mixture area, the reference numeral 204 denotes a second pixel mixture unit consisting of a plurality of pixels which form a second pixel mixture area, and the reference numeral 205 denotes a third pixel mixture unit consisting of a plurality of pixels which form a third pixel mixture area. Moreover, in FIG. 10, the reference numeral 206 denotes a vertical shift register and the reference numeral 207 denotes a path of a signal output from the vertical shift register 206.

Hereinafter, for the purpose of simplification, the operations of two types of pixels of the four pixels constituting the pixel unit 202 which are represented by shadowed square and circle, respectively, will be described.

In the first pixel mixture unit 203, nine pixels represented by shadowed squares are pixels of which the charge signals are to be mixed. When sequential scanning of the vertical shift register 206 has been performed from the 1st row to the 5th row, charge signals of the nine pixels which are to be pixel mixture targets and are represented by the shadowed squares are obtained. Thereafter, pixels are mixed.

At this time, scanning of the vertical shift register 206 has performed up to the 5th row, and signals of three pixels which constitute the second pixel mixture unit 204 and are represented by shadowed circles have been output. Therefore, it is necessary to hold these signals.

Next, when scanning of the vertical shift register 206 performs from the sixth row to the 8th row, pixel mixture is performed to signals of six pixels which are to be pixel mixture targets located at the 6th and 8th rows and are represented by shadowed circles and the three pixels of the 4th row which have been already held. Then, signals of three pixels which are located at the $7^{th}$, constitute the third pixel mixture unit 205 and are represented by shadowed squares are held.

(Second Known Example)

Hereinafter, as a second known example, a solid state imaging apparatus using a driving circuit described in Japanese Unexamined Patent Publication No. 2002-314882 will be described with reference to FIG. 11.

As shown in FIG. 11, the solid state imaging apparatus includes an imaging section 301 having a plurality of pixel sections 3011, 3012, 3013, ... which are arranged in a matrix, a driving circuit 303 for supplying a column selection signal to a column selection signal line 302, and a driving circuit 307 for supplying a row selection signal to a row selection signal line 308.

FIG. 12 is a diagram illustrating a block diagram of the driving circuit 303. As shown in FIG. 12, when a scan pulse 309 is input to a driving register 3031 and, furthermore, a clock pulse 305 is applied thereto, an output signal 310 of the driving register 3031 is input to the selection circuit 3041. The selection circuit 3041 outputs an output of the driving register 3031 to a driving register 3032 or a driving register 3033 according to the selection signal 306. Specifically, when the control signal 306 indicating sequential scanning is input, the driving registers sequentially output respective column selection signals, for example, in the manner in which the driving registers 3031, 3032, 3033, 3034, ... output respective column selection in this order. Thus, pixels are scanned through sequential scanning, for example, in the manner in which the pixel sections 3011, 3012, 3013, 3014, ... are scanned in this order.

Moreover, when a control signal 306 indicating interlaced scanning, every second driving register outputs a column selection signal to the column selection signal line 302, for example, in the manner in which the driving register 3031, 3033, 3035, ... output respective column selection signals in this order. Thus, pixels are scanned through interlaced scanning, for example, in the manner in which the pixel sections 3011, 3013, 3015, ... are scanned in this order.

By the way, in the solid state imaging apparatus of the first known example, an operation in which signals of pixels in a row of a pixel mixture unit (a basic unit of a pixel mixture area) in a subsequent stage is not immediately output but held is required in scanning in the vertical direction.

Thus, in the known solid state imaging apparatus, in the process of scanning a solid stage imaging element in the vertical direction, an operation of holding signals of pixels in a row of a pixel mixture unit constituting a subsequent stage is required. Therefore, a first problem arises in which the operation and circuit configuration of the solid state imaging apparatus becomes complicated.

Moreover, for recent solid state imaging apparatuses, there have been increased demands for use of a solid state imaging apparatus in dealing with not only a static image but also a moving image. For example, in a digital camera, a solid state imaging apparatus loaded in a digital camera outputs a moving image as a monitor image to be displayed on a liquid crystal display panel. However, although the solid state imaging apparatus of the second known example can perform interlaced scanning to deal with a moving image, pixels are thinned out due to the interlaced scanning, so that part of pixel information is omitted. Therefore, a second problem arises in which an unnatural color appears in a display image, i.e., so-called false color occurs, resulting in poor image quality.

SUMMARY OF THE INVENTION

In view of the first problem, it is therefore a first object of the present invention to provide a solid state imaging apparatus in which an operation of holding pixels constituting a pixel mixture unit in a subsequent stage does not have to be performed.

Moreover, in view of the second problem, it is a second object of the present invention to prevent the occurrence of a false color due to omission of pixel information even when image pickup is performed to a moving image.

To achieve the first object, a solid state imaging apparatus according to the present invention is directed to a solid state imaging apparatus which includes a plurality of pixels two-dimensionally arranged in the vertical direction and the horizontal direction and in which every two vertically or horizontally adjacent ones of the plurality of pixels includes color filters of different colors. The solid state imaging apparatus is characterized by comprising signal output means for sequentially outputting, in a predetermined period of time, charge signals received from ones of the plurality of pixels including color filters of the same color.

In the first solid state imaging apparatus, when charge signals received from pixels including color filters of a first color are being output, charge signals received from pixels including color filters of a second color do not have to be output. Accordingly, an operation of holding signals output from the pixels including color filters of the second color is not necessary. Thus, an operation of holding pixels constituting a pixel mixture unit in a subsequent stage is not necessary.

In the first solid state imaging apparatus, it is preferable that the signal output means includes means for sequentially outputting, in the predetermined period of time, charge signals received from ones of a plurality of pixels arranged in the horizontal direction and including color filters of the same color.

Thus, when charge signals received from pixels of a group of pixels arranged in the horizontal direction which include color filters of a first color are being output, charge signals received from other pixels of the group of pixels arranged in the horizontal direction which include color filters of a second color do not have to be output. Therefore, an operation of holding signals output from the pixels which include color filters of the second color is not necessary.

In the first solid state imaging apparatus of the present invention, it is preferable that the signal output means includes means for sequentially outputting, in the predetermined period of time, charge signals received from ones of the plurality of pixels arranged in the vertical direction and including color filters of the same color.

Thus, when charge signals received from pixels of a group of pixels arranged in the vertical direction which include color filters of a first color, charge signals received from other pixels of the group of pixels arranged in the vertical direction which include color filters of a second color do not have to be output. Therefore, an operation of holding signals output from the pixels which include color filters of the second color is not necessary.

In the first solid state imaging apparatus of the present invention, it is preferable that the signal outputting means includes a first shift register for performing sequential scanning to ones of the plurality of the pixels arranged in the vertical direction or the horizontal direction and a second shift register for performing sequential scanning to ones of the plurality of the pixels arranged in the vertical direction or the horizontal direction and including color filters of the same color.

Thus, one of the first shift register and the second shift register is selected, thereby selecting one of a regular operation in which sequential scanning is performed to pixels arranged in the vertical direction or the horizontal direction and a mixing operation in which sequential scanning is performed to pixels including color filters of the same color.

In the first solid state imaging apparatus of the present invention, it is preferable that the signal outputting means includes a shift register for performing sequential scanning to ones of the plurality of the pixels arranged in the vertical direction or the horizontal direction and output means for switching between a first output method in which charge signals received from the shift register are output so that charge signals of pixels arranged in the vertical direction or the horizontal direction are sequentially output and a second output method in which charge signals received from the shift register are sequentially output so that charge signals of pixels including color filters of the same color are sequentially output, and then outputting charge signals.

Thus, by switching between the first output method and the second output method, one of a regular operation in which signals from all of pixels arranged in the vertical direction or the horizontal direction are sequentially output and a mixing operation in which signals from ones of the pixels arranged in the vertical direction or the horizontal direction which include color filters of the same color are sequentially output can be selected.

Moreover, to achieve the second object, a second solid state imaging apparatus according to the present invention is characterized by including: a plurality of pixels two-dimensionally arranged in the row direction and the column direction; a sensor section for outputting a plurality of selection signals so that each of the selection signals corresponds to one of a plurality of pixel arrays extending in the row direction or the column direction in an arrangement of the plurality of pixels; a first driving circuit for making the sensor section output the selection signals to the pixel arrays so that one of the selection signals for one of the pixel arrays is output at a time; and a second driving circuit for making the sensor section output the selection signals to the pixel arrays so that ones of the selection signals for plural ones of the pixel arrays are output at a time.

In the second solid state imaging apparatus, in a high-speed operation state, i.e., a moving image mode, the selection signals from the second driving circuit are output to the pixel arrays so that ones of the selection signals for plural ones of the pixel arrays are output at a time. Thus, if pixel signals output from the pixel arrays which have received the plurality of selection signals are averaged and then a size-reduced image using the averaged pixel signal as a new pixel unit is generated, an image without pixel omission can be obtained, so that the occurrence of a false color in a moving mode can be prevented. Therefore, quality of a moving image can be improved.

It is preferably that the second solid state imaging apparatus further includes a selection circuit for selecting a first driving signal sequentially output from the first driving circuit so that the first driving signal corresponds to each of the pixel arrays or a second driving signal sequentially output from the second driving circuit so that the second driving signal corresponds to plural ones of the pixel arrays, and then outputting a selected driving signal to the sensor section.

Thus, with the selection circuit provided, a static image mode and a moving image mode can be reliably switched around in a simple manner.

In the second solid state imaging apparatus, it is preferable that the selection circuit includes a first transistor group for outputting the first driving signals to the sensor section so that one of the selection signals for one of the pixel arrays are output at a time and a second transistor group for outputting the second driving signals to the sensor section so that ones of the selection signals for plural ones of the pixel arrays are output at a time.

In this case, it is preferable that each of the first and second transistor groups includes a CMOS transistor.

Moreover, in this case, it is preferable that each of the first and second transistor groups includes an NMOS transistor.

A method for driving a solid state imaging apparatus according to the present invention is a method for driving a solid state imaging apparatus including a plurality of pixels two-dimensionally arranged in the row direction and the column direction and a sensor section for outputting a plurality of selection signals so that each of the selection signals corresponds to one of a plurality of pixel arrays extending in the row direction or the column direction in an arrangement of the plurality of pixels, and having a static mode in which image pickup is performed to a static image and a moving image mode in which image pickup is performed to a moving image, and is characterized by including a first step of outputting, when the static mode is selected, the selection signals from the sensor section to the pixel arrays so that one of the selection signals for one of the pixel arrays is output at a time; and a second step of outputting, when the moving mode is selected, the selection signals from the sensor section to the pixel arrays so that ones of the selection signals for plural ones of the pixel arrays are output at a time.

According to the method for driving the solid state imaging apparatus of the present invention, when a moving mode is selected, the selection signals are output to the pixel arrays so that ones of the selection signals for plural ones of the pixel arrays are output at a time. Thus, if pixel signals output from the pixel arrays which have received the plurality of selection signals are averaged and then a size-reduced image using the averaged pixel signal as a new pixel unit is generated, an image without pixel omission can be obtained, so that the occurrence of a false color in a moving mode can be prevented. Therefore, quality of a moving image can be improved.

A camera according to the present invention is characterized by including the first or second solid state imaging apparatus.

In the camera of the present invention, the occurrence of a false color in a moving image can be prevented. Therefore, quality of a moving image can be improved.

DESCRIPTION OF THE PREFERRED EMBODIMENTS

First Embodiment

A solid state imaging apparatus according to a first embodiment of the present invention will be described with reference to FIGS. 1 through 5.

(Arrangement of Solid State Imaging Apparatus and Scanning Method According to A First Embodiment of The Present Invention)

Figure 1:
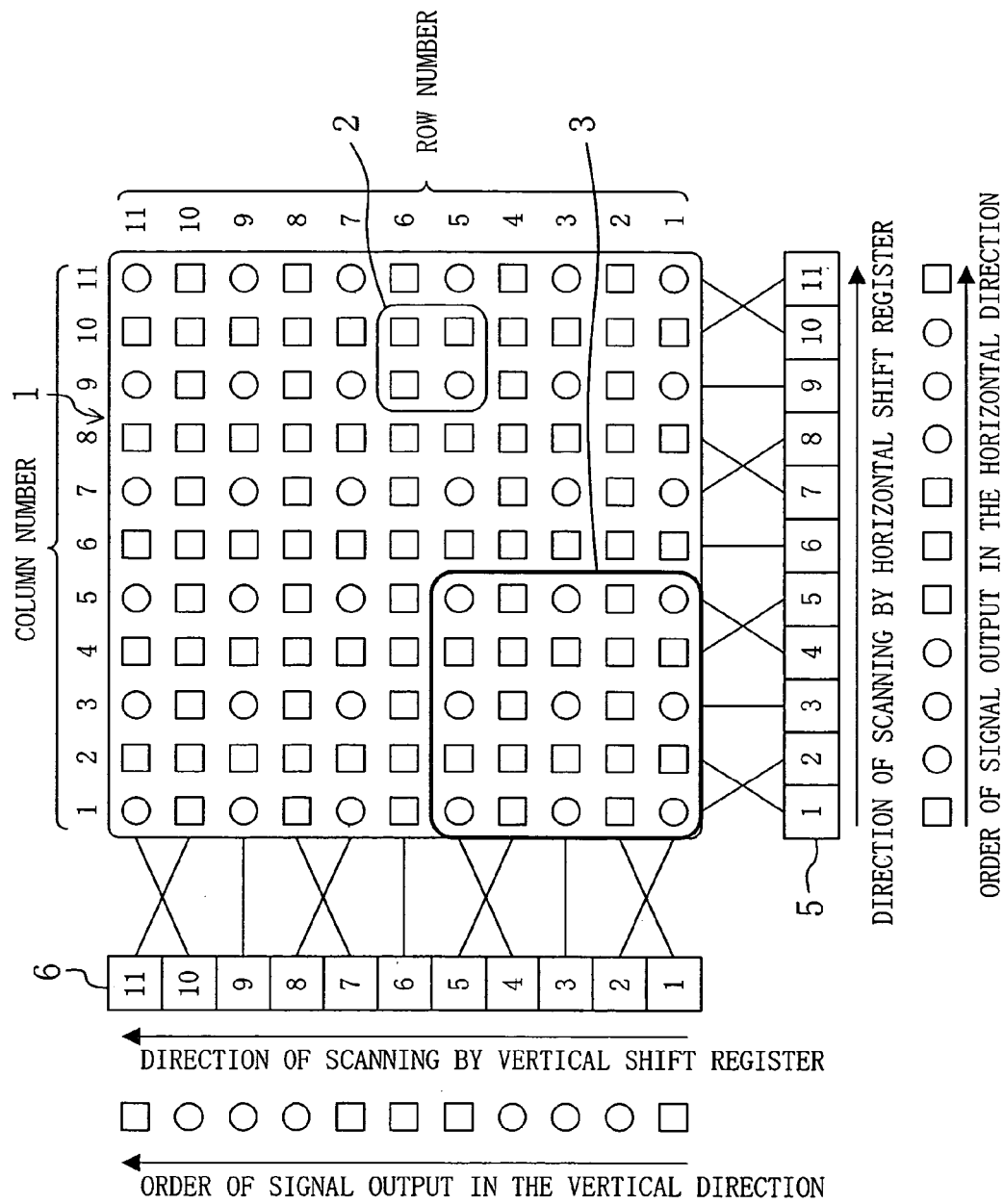
FIG. 1 is a diagram of the configuration of a solid state imaging apparatus according to a first embodiment of the present invention.

FIG. 1 illustrates an arrangement of a solid state imaging apparatus and a scanning method according to a first embodiment of the present invention. In the solid state imaging apparatus, a plurality of pixels each of which includes a photoelectric conversion element and a color filter provided on the front face of the photoelectric conversion element are two-dimensionally arranged in the row direction (vertical direction) and the column direction (horizontal direction), and the pixels are dimensionally arranged so that two different colors as a unit appear repeatedly every two rows or every two columns.

In FIG. 1, a circle represents a pixel including a color filter of a first color and a square represents a pixel including a color filter of a second color which is different from the first color. Note that as for pixels represented by squares, there are pixels including color filters of the second color and pixels including color filters of a different color to the second color. As clearly shown in FIG. 1, a pixel including a color filter of the first color (i.e., a pixel represented by a circle) is not adjacent either in the row direction or in the column direction to another pixel including a color filter of the first color. That is to say, every two pixels of the plurality of pixels adjacent to each other in the vertical direction or in the horizontal direction include color filters of different colors, respectively.

Moreover, in FIG. 1, the reference numeral 1 denotes a set of a plurality of pixels arranged in a matrix, the reference numeral 2 denotes a pixel unit consisting of four pixels arranged in two rows and two columns, the reference numeral 3 denotes a pixel mixture unit consisting of 25 pixels in five rows and five columns. In this embodiment, in a predetermined period of time, signals from ones of a plurality of pixels constituting the pixel mixture unit 3 which include color filters of the first color are sequentially output. The reference numeral 5 denotes a horizontal shift register for scanning pixels arranged in the row direction (i.e., the horizontal direction) and the reference numeral 6 denotes a vertical shift register for scanning pixels arranged in the column direction (i.e., the vertical relation). Moreover, in this embodiment, as shown in FIG. 1, outputs 1, 2, 3, 4, 5, 6, 7, 8, 9, 10 and 11 from the horizontal shift register 5 are connected to pixel columns 2, 1, 3, 5, 4, 6, 8, 7, 9, 11 and 10, respectively, and outputs 1, 2, 3, 4, 5, 6, 7, 8, 9, 10 and 11 from the vertical shift register 6 are connected to pixel rows 2, 1, 3, 5, 4, 6, 8, 7, 9, 11 and 10, respectively.

When the horizontal shift register 5 performs sequential scanning, signal output in the horizontal direction is performed so that signals from the pixel columns 2, 1, 3, 5, 4, 6, 8, 7, 9, 11 and 10 are output in this order. As shown below the horizontal shift register 5 in FIG. 1, the respective pixels of the column numbers 1, 3 and 5 (represented by circles) and the respective pixels of the column numbers 7, 9 and 11

(represented by circles) are continuously output. That is to say, in a predetermined period of time, the respective pixels of the column numbers 1, 3 and 5 constituting a pixel mixture unit 3 are continuously output and mixed.

Moreover, when the vertical shift register 6 performed sequential scanning, signal output in the vertical direction is performed so that signals from the pixel rows 2, 1, 3, 5, 4, 6, 8, 7, 9, 11, and 10 are output in this order. As shown at the left of the vertical shift register 6 in FIG. 1, the respective pixels of the row numbers 1, 3 and 5 (represented by circles) and the respective pixels of the row numbers 7, 9 and 11 (represented by circles) are continuously output. That is to say, in a predetermined period of time, the respective pixels of the row numbers 1, 3 and 5 constituting a pixel mixture unit 3 are continuously output and mixed.

(A First Signal Transmission Method in A Solid State Imaging Apparatus According to The First Embodiment of The Present Invention)

Figure 2:
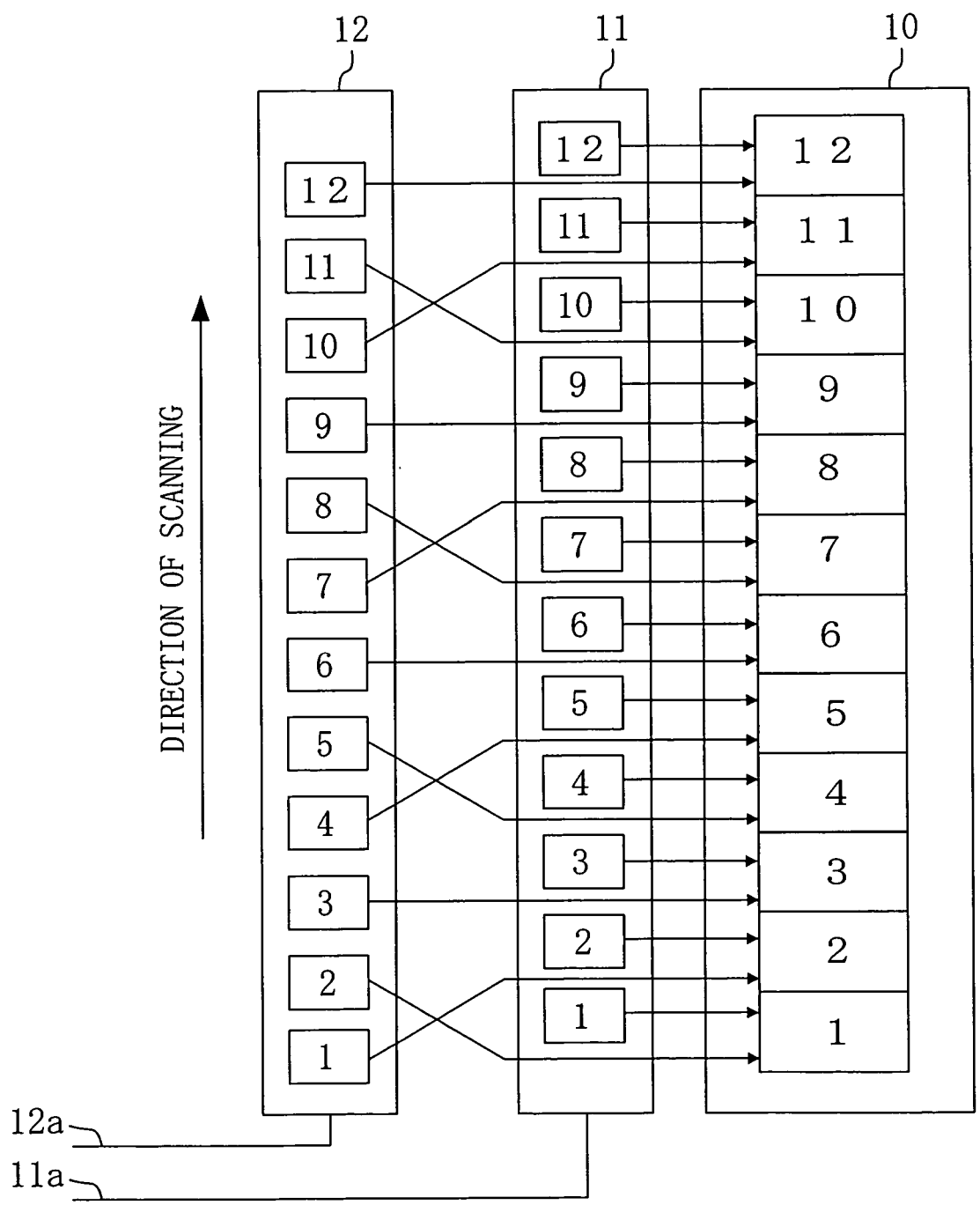
FIG. 2 is a diagram illustrating a first example of a first signal transmission method in a solid state imaging apparatus according to the first embodiment of the present invention.

FIG. 2 illustrates a first example of a first signal transmission method in a solid state imaging apparatus according to the first embodiment of the present invention.

In FIG. 2, the reference numeral 10 denotes a single line pixel group arranged in the column direction in a sensor section, the reference numeral 11 denotes a first vertical shift register for performing sequential scanning in the vertical direction to all of pixels constituting the single line pixel group 10, and the reference numeral 12 denotes a second vertical shift register for performing sequential scanning to ones of the pixels constituting the single line pixel group 10 which are included in a pixel mixture unit and have color filters of the same color. Note that in FIG. 2, the reference numeral 11a denotes a first scanning start terminal of the first vertical shift register 11, the reference numeral 12a denotes a second scanning start terminal of the second vertical shift register 12. A scanning start signal is applied to one of the first scanning start terminal 11a and the second scanning start terminal 12a, thereby selecting the first vertical shift register 11 or the second vertical shift register 12.

Hereinafter, the operation of the first example of the first signal transmission method shown in FIG. 2 will be described.

In the case of regular scanning, when a scanning start signal is applied to the first scanning start terminal 11a, the first vertical shift register 11 starts scanning. In this case, the first vertical shift register 11 performs sequential scanning to all of pixels constituting the single line pixel group 10. Accordingly, the solid state imaging apparatus performs a regular operation.

On the other hand, in the case of pixel mixture, when a scanning start signal is applied to the second scanning start signal terminal 12a, the second vertical shift register 12 starts scanning. In this case, the second vertical shift register 12 performs sequential scanning to ones of the pixels constituting the single line pixel group 10 which are included in a pixel mixture unit and include color filters of the same color. Accordingly, the solid state imaging apparatus performs a pixel mixture operation.

Figure 3:
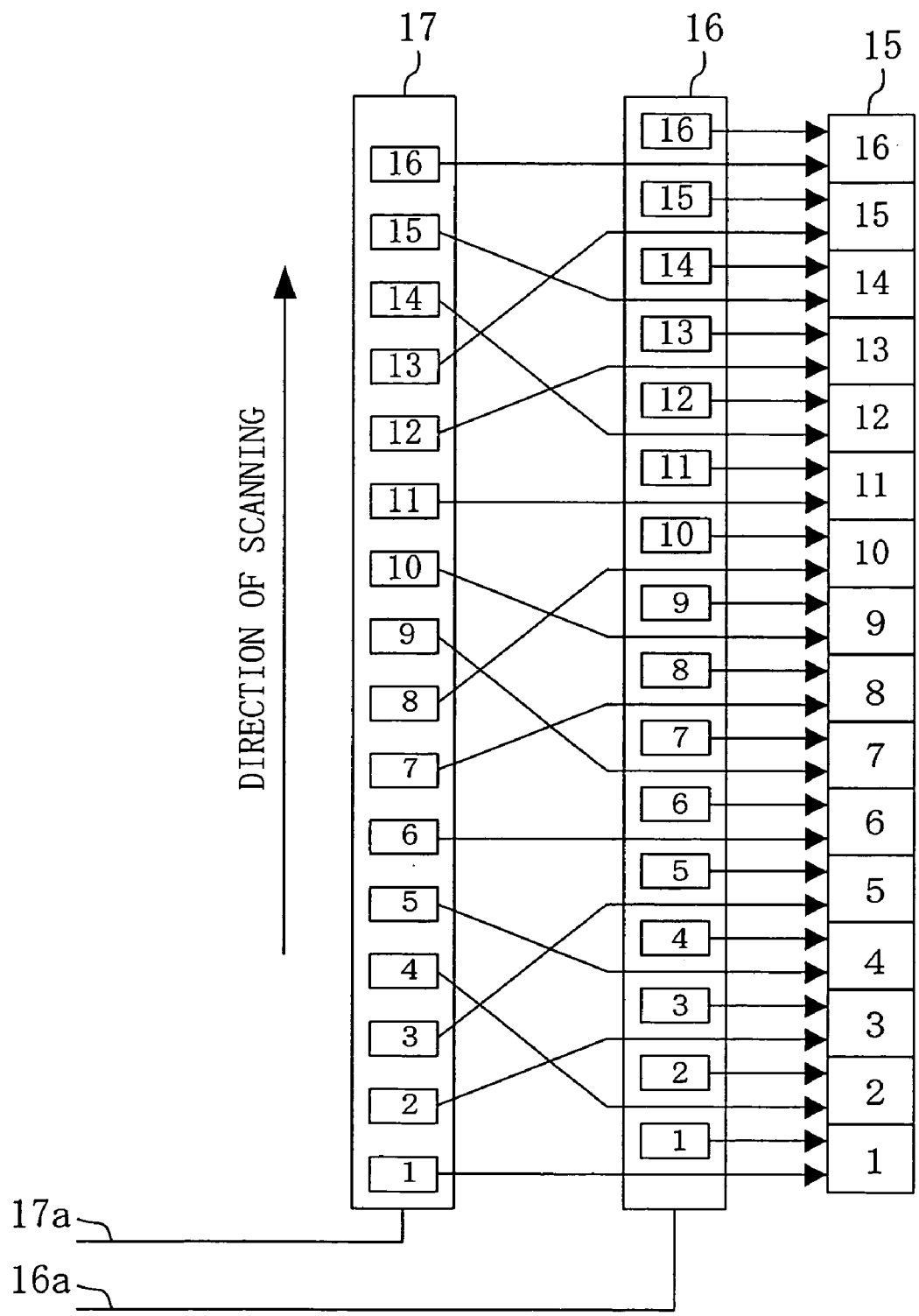
FIG. 3 is a diagram illustrating a second example of the first signal transmission method in a solid state imaging apparatus according to the first embodiment of the present invention.

FIG. 3 illustrates a second example of the first signal transmission method in the solid state imaging apparatus according to the first embodiment of the present invention.

In FIG. 3, the reference numeral 15 denotes a single line pixel group arranged in the column direction in a sensor section, the reference numeral 16 denotes a first vertical shift register for performing sequential scanning in the vertical direction to all of pixels constituting the single line pixel group 15, and the reference numeral 17 denotes a second vertical shift register for performing sequential scanning to ones of the pixels constituting the single line pixel group 15 which are included in a pixel mixture unit and have color filters of the same color. Note that in FIG. 3, the reference numeral 16a denotes a first scanning start terminal of the first vertical shift register 16, the reference numeral 17a denotes a second scanning start terminal of the second vertical shift register 17. A scanning start signal is applied to one of the first scanning start terminal 16a and the second scanning start terminal 17a, thereby selecting the first vertical shift register 16 or the second vertical shift register 17.

Hereinafter, the operation of the second example of the first signal transmission method shown in FIG. 3 will be described.

In the case of regular scanning, when a scanning start signal is applied to the first scanning start terminal 16a, the first vertical shift register 16 starts scanning. In this case, the first vertical shift register 16 performs sequential scanning to all of pixels constituting the single line pixel group 15. Accordingly, the solid state imaging apparatus performs a regular operation.

On the other hand, in the case of pixel mixture, when a scanning start signal is applied to the second scanning start signal terminal 17a, the second vertical shift register 17 starts scanning. In this case, the second vertical shift register 17 performs sequential scanning to ones of the pixels constituting the single line pixel group 15 which are included in a pixel mixture unit and include color filters of the same color. Accordingly, the solid state imaging apparatus performs a pixel mixture operation.

(A Second Signal Transmission Method in A Solid State Imaging Apparatus According to The First Embodiment of The Present Invention)

Figure 4:
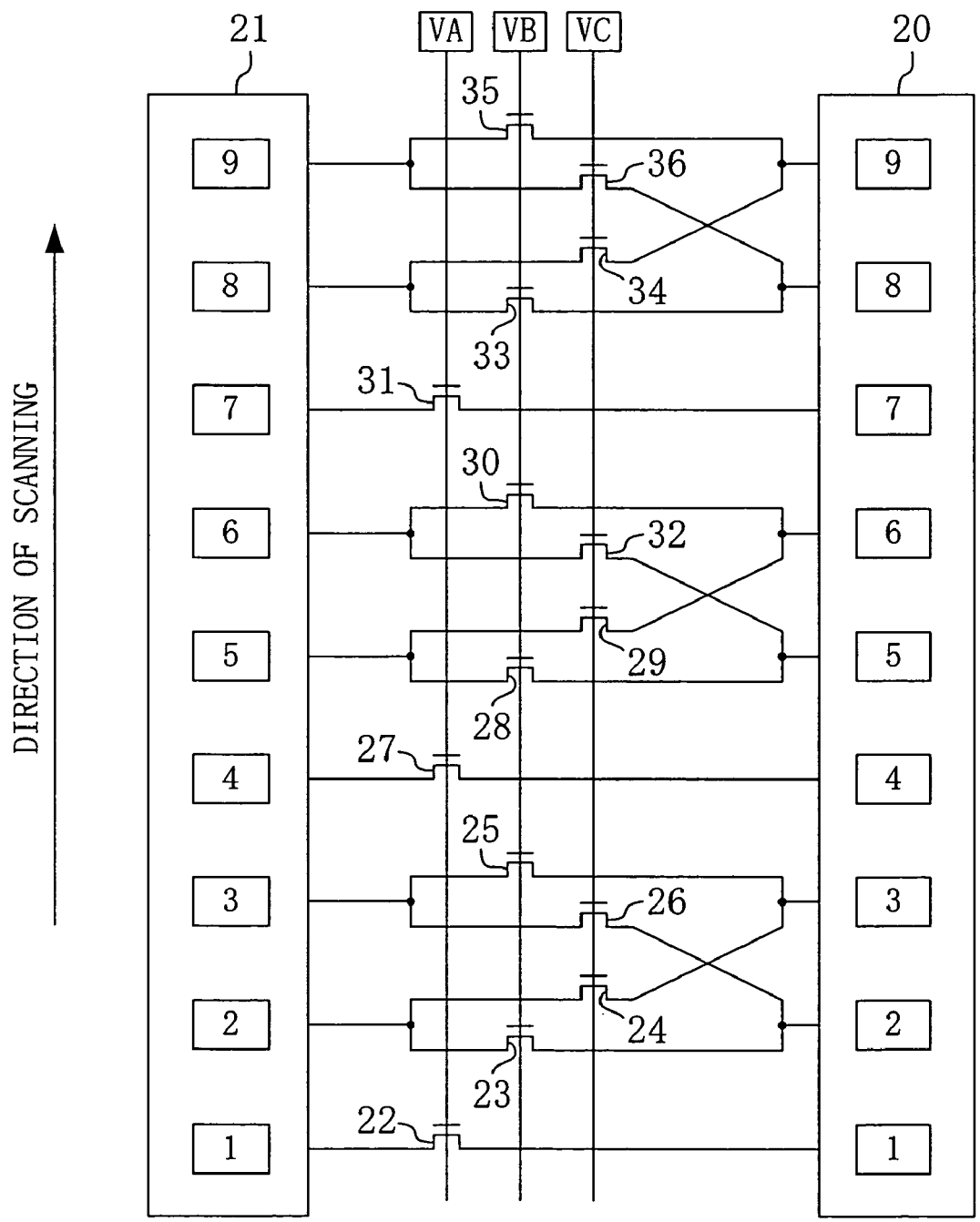
FIG. 4 is a diagram illustrating a first example of a second signal transmission method in a solid state imaging apparatus according to the first embodiment of the present invention.

FIG. 4 illustrates a first example of a second signal transmission method in a solid state imaging apparatus according to the first embodiment of the present invention.

In FIG. 4, the reference numeral 20 denotes a single line pixel group arranged in the column direction in a sensor section, the reference numeral 21 denotes a vertical shift register for performing sequential scanning in the vertical direction to all of pixels constituting the single line pixel group 20. Moreover, in FIG. 4, the reference numerals 22, 23, 24, 25, 26, 27, 28, 29, 30, 31, 32, 33, 34, 35 and 36 denote transistors, respectively. Respective gates of the transistor 22, 27 and 31 are connected to a gate signal line VA, respective gates of the transistors 23, 25, 28, 30, 33 and 35 are connected to a gate signal line VB and respective gates of the transistors 24, 26, 29, 32, 34 and 36 are connected to a gate signal line VC.

As shown in FIG. 4, an output 1 of the vertical shift register 21 is connected to a sensor section 1 via the transistor 22, an output 2 of the vertical shift register 21 is connected to a sensor section 2 via the transistor 23 and to a sensor section 3 via the transistor 23, and an output 3 of the vertical shift register 21 is connected to a sensor section 2 via the transistor 26 and to the sensor section 3 via a transistor 25. In the same manner as that for connecting the outputs 1 through 3 to the associated ones of the sensor sections, outputs 4 through 9 are connected to associated ones of sensor sections 4 through 9 via associated ones of transistors 27 through 36.

Hereinafter, the operation of the first example of the second signal transmission method shown in FIG. 4 will be described.

In the case of regular scanning, the gate signal line VA and the gate signal line VB are set to be high whereas the gate signal line VC is set to be low. Thus, the vertical shift register 21 sequentially outputs signals of all of the pixels constituting the single line pixel group 20. Accordingly, the solid state imaging apparatus can perform a regular operation.

On the other hand, in the case of pixel mixture, the gate signal line VA and the gate signal line VC are set to be high whereas the gate signal line VB is set to be low. Thus, the vertical shift register 21 outputs in a predetermined period of time signals from ones of the pixels constituting the single line pixel group 20 which are included in a pixel mixture unit and have color filters of the same color. Accordingly, the solid state imaging apparatus can perform a pixel mixture operation.

As has been described, the type of a signal to be applied to the gate signal lines VA, VB and VC is selected, so that it is possible to switch between a sequential scanning method and a pixel mixture scanning method in the vertical shift register 21.

Figure 5:
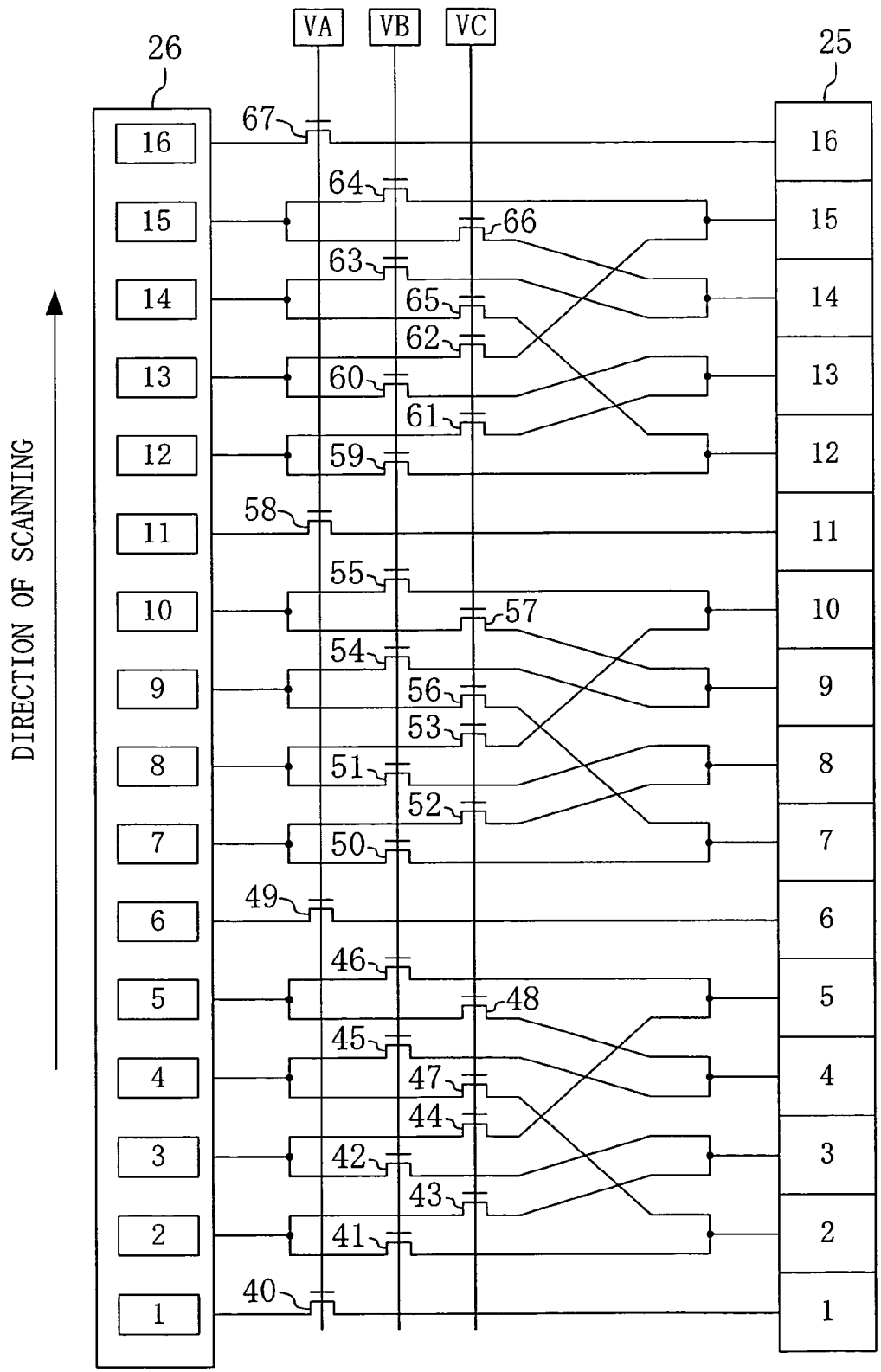
FIG. 5 is a diagram illustrating a second example of the second signal transmission method in a solid state imaging apparatus according to the first embodiment of the present invention.

FIG. 5 illustrates a second example of the second signal transmission method in the solid state imaging apparatus according to the first embodiment of the present invention.

In FIG. 5, the reference numeral 25 denotes a single line pixel group arranged in the column direction in a sensor section, the reference numeral 26 denotes a vertical shift register for performing sequential scanning in the vertical direction to all of pixels constituting the single line pixel group 25. Moreover, in FIG. 5, the reference numerals 40, 41, 42, 43, 44, 45, 46, 47, 48, 49, 50, 51, 52, 53, 54, 55, 56, 57, 58, 59, 60, 61, 62, 63, 64, 65, 66 and 67 denote transistors, respectively. Respective gates of the transistors 40, 49, 58 and 67 are connected to a gate signal line VA, respective gates of the transistors 41, 42, 45, 46, 50, 51, 54, 55, 59, 60, 63 and 64 are connected to a gate signal line VB and respective gates of the transistors 43, 44, 47, 48, 52, 53, 56, 57, 61, 62, 65 and 66 are connected to a gate signal line VC.

Hereinafter, the operation of the second example of the second signal transmission method shown in FIG. 5 will be described.

In the case of regular scanning, the gate signal line VA and the gate signal line VB are set to be high whereas the gate signal line VC is set to be low. Thus, the vertical shift register 26 sequentially outputs signals of all of the pixels constituting the single line pixel group 25. Accordingly, a solid state imaging apparatus can perform a regular operation.

On the other hand, in the case of pixel mixture, the gate signal line VA and the gate signal line VC are set to be high whereas the gate signal line VB is set to be low. Thus, the vertical shift register 26 outputs in a predetermined period of time signals from ones of the pixels constituting the single line pixel group 25 which are included in a pixel mixture unit and have color filters of the same color. Accordingly, the solid state imaging apparatus can perform a pixel mixture operation.

As has been described, the type of a signal to be applied to the gate signal lines VA, VB and VC is selected, so that it is possible to switch between a sequential scanning method and a pixel mixture scanning method in the vertical shift register 26.

Second Embodiment

Hereinafter, a second embodiment of the present invention will be described with reference to the accompanying drawings.

Figure 6:
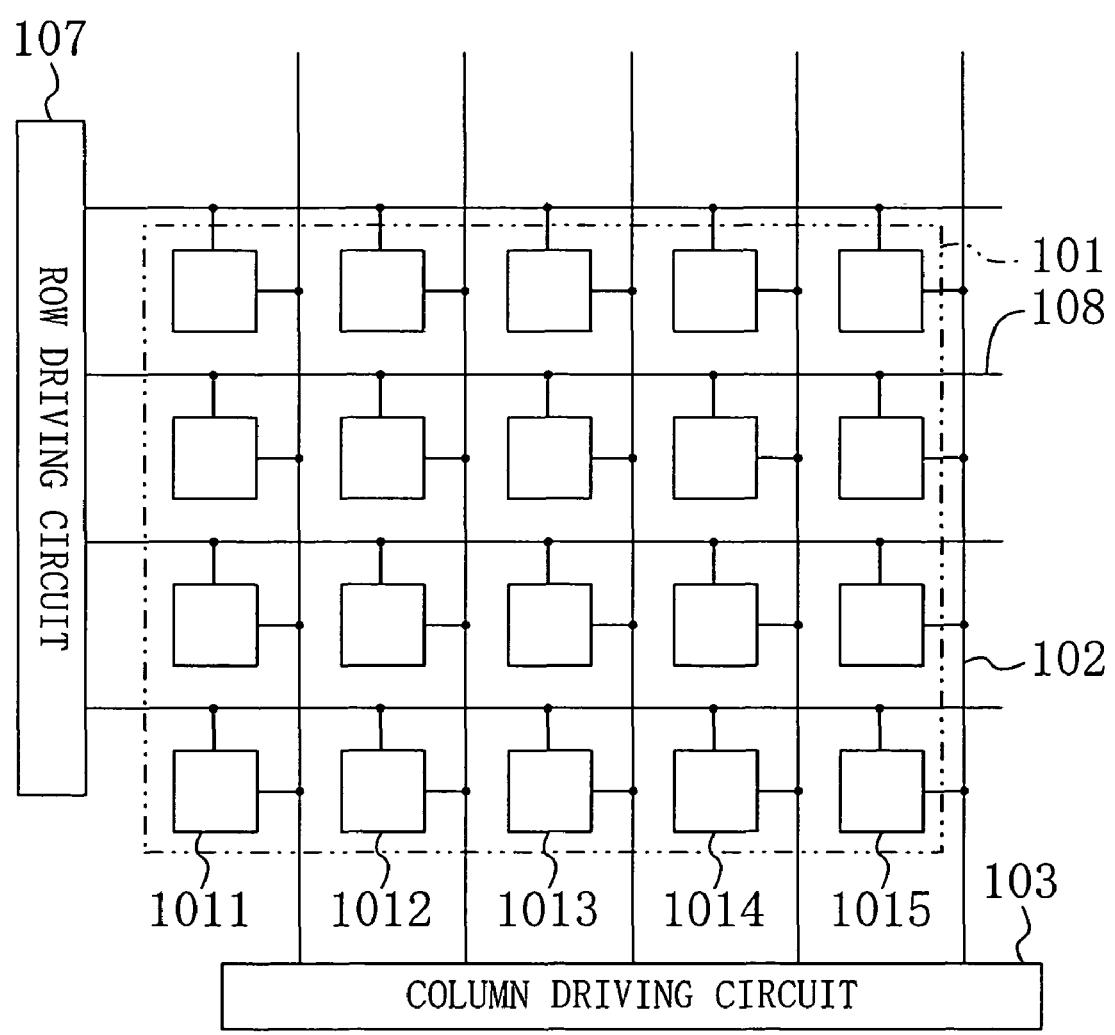
FIG. 6 is a diagram of the configuration of a solid state imaging apparatus according to a second embodiment of the present invention.

FIG. 6 is a diagram of the configuration of major part of a solid state imaging apparatus according to a second embodiment of the present invention. As shown in FIG. 6, the solid state imaging apparatus of the second embodiment includes an imaging section 101 having a plurality of pixel sections 1011, 1012, 1013, . . . which are arranged in a matrix, a column driving circuit 103 for supplying a column selection signal to a column selection signal line 102, and a row driving circuit 107 for supplying a row selection signal to a row selection signal line 108.

Figure 7:
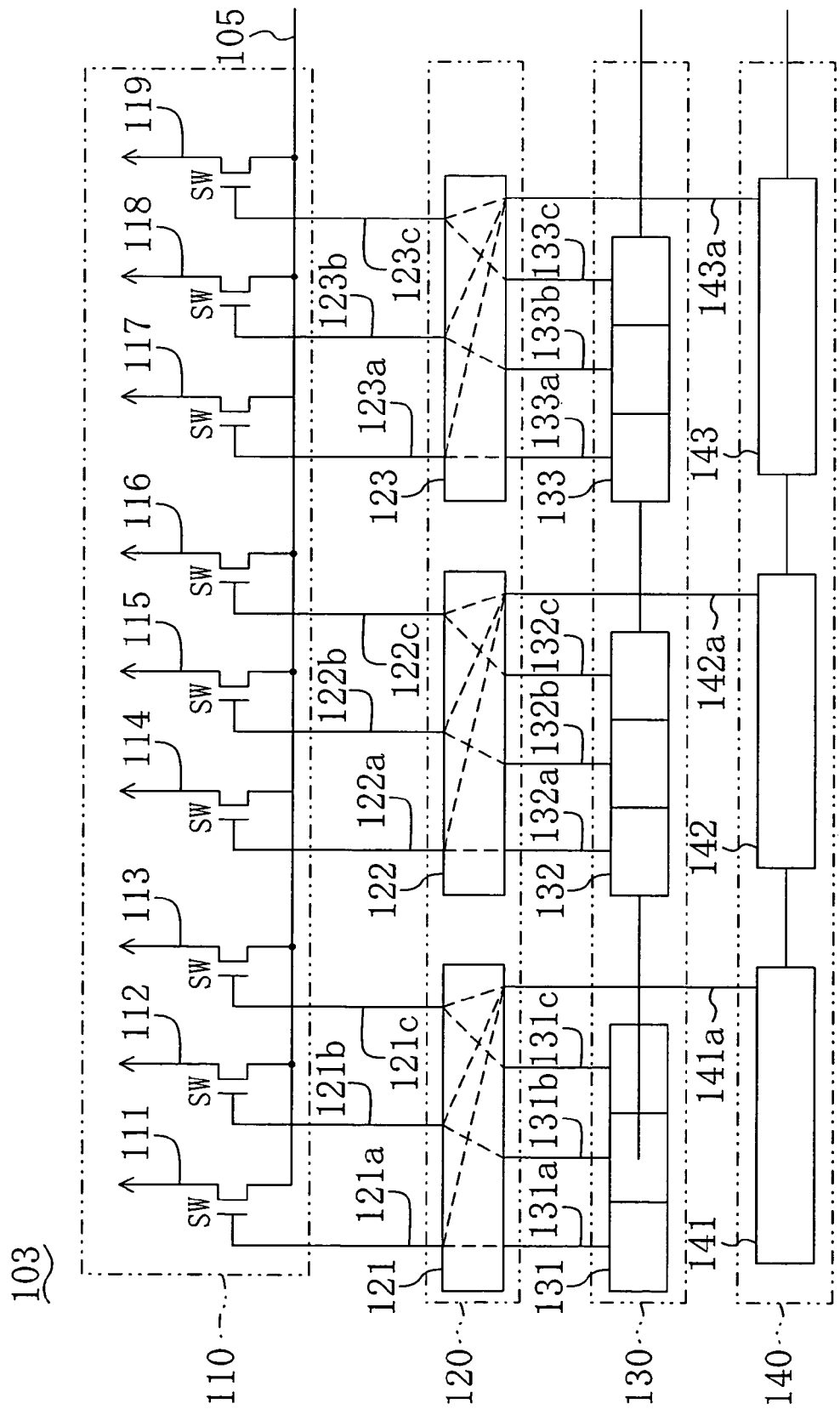
FIG. 7 is a block diagram of a column driving circuit in the solid state imaging apparatus of the second embodiment of the present invention.

A block configuration of the column driving circuit 103 is shown in FIG. 7. As shown in FIG. 7, the column driving circuit 103 includes a sensor section 110, a selection circuit 120, a first driving circuit 130 and a second driving circuit 140.

The sensor section 110 includes column selection signal lines 111, 112, 113, . . . each of which is to be connected to the column selection signal line 102 shown in FIG. 6 and a plurality of read-out switch transistors SW each of which is connected to an associated one of the column selection signal lines and is made of an MOS transistor. Each of the switch transistors SW each including a drain connected to an associated one of the column selection signal lines 111, 112, 113, . . . includes a source connected to a detection signal line 105 and receives at a gate driving signal 121a, 121b, 121c, 122a, 122b, 122c, 123a, 123b or 123c from the selection circuit 120.

The selection circuit 120 is divided into a first block 121, a second block 122 and a third block 123. In the first block 121, first driving signals 131a, 131b and 131c from the first driving circuit 130 and a second driving signal 141a from the second driving circuit 140 are received. In the second block 122, first driving signals 132a, 132b and 132c from the first driving circuit 130 and a second driving signal 142a from the second driving circuit 140 are received. In the third block 123, first driving signals 133a, 133b and 133c from the first driving circuit 130 and a second driving signal 143a from the second circuit 140 are received.

Accordingly, the selection signal circuit 120 selects the first driving signals 131a through 133c from the first driving circuit 130 or the second driving signals 141a, 142a and 143a form the second driving circuit 140 and then outputs the selected signals as the driving signals 121a through 123c.

Each of the switch transistors SW receives an associated one of the driving signals 121a through 123c selected by the selection circuit 120 at the gate to be conductive, and then outputs a pixel signal in a selected pixel row in a corresponding pixel column to the detection signal line 105.

More specifically, the selection circuit 120 selects the first signals from the first driving circuit 130 in a static image mode which is changeable by an instruction from the outside of the apparatus and in which image pickup is performed to a static image. On the other hand, the selection circuit 120 selects the second driving circuit 140 in a moving image mode in which image pickup is performed to a moving image. In this case, when the first driving signals from the first driving circuit 130 are selected, the selection circuit 120 performs sequential scanning. When the second driving signals from the second driving circuit 140 are selected, the selection circuits 120 does not perform interlaced scanning but simultaneously outputs the driving signals for a plurality of columns (i.e., the driving signals 121a, 121b and 121c or the like for three columns in this embodiment).

The first driving circuit 130 outputs the same number of driving signals as the same number of pixel columns of the imaging section 101, i.e., the first driving signals 131a through 131c, 132a through 132c and 133a through 133c. Among the output signals, the first driving signals 131a through 131c are output from the first block 131, the first driving signals 132a through 132c are outputs from the second block 132, and the first driving signals 133a through 133c are output from the third block 133.

The second driving circuit 140 outputs driving signals in one third of the number of the number of pixel columns of the imaging section 101, i.e., the second driving signals 141a, 142a and 143a. Among the output signals, the second driving signal 141a is output from the first block 141, the second driving signal 142a is output from the second block 142, and the second driving signal 143a is output from the third block 143.

With the above-described configuration, the first driving signals 131a, 131b and 131c, the first driving signals 132a, 132b and 132c, and the first driving signals 133a, 133b and 133c sequentially output from the first driving circuit 130 are sequentially applied to respective gates of the switch transistors SW connected to the column signal lines 111 through 119, respectively, via the selection circuit 120. Thus, pixel signals sequentially read out by the column selection signal lines 111 through 119 are output as detection signals to the detection signal line 105 via the switch transistors SW.

On the other hand, for example, the second driving signal 141a output from the first block 141 of the second driving circuit 140 is output as each of the three driving signals 121a, 121b and 121c from the selection circuit 120 at a gate of an associated one of the switch transistors SW of the column selection signal lines 111 through 113. As a result, detection signals from the column signal lines 111 through 113 are simultaneously output to the detection signal line 105. In the same manner, the second driving signal 142a output from the second block 142 is simultaneously output as each of the three driving signals 122a, 122b and 122c from the selection circuit 120. As a result, detection signals from the column selection lines 114 through 116 are simultaneously output to the detection signal line 105. Moreover, the second driving signal 143a output from the third block 143 is simultaneously output as each of the three driving signals 123a, 123b and 123c from the selection circuit 120. As a result, detection signals from the column selection signal lines 117 and 119 are simultaneously output to the detection signal line 105. In this case, voltage levels of the three detection signals from, for example, the column selection signal lines 111 through 113, are averaged and then the averaged voltage level is output to the detection signal line 105.

Figure 8:
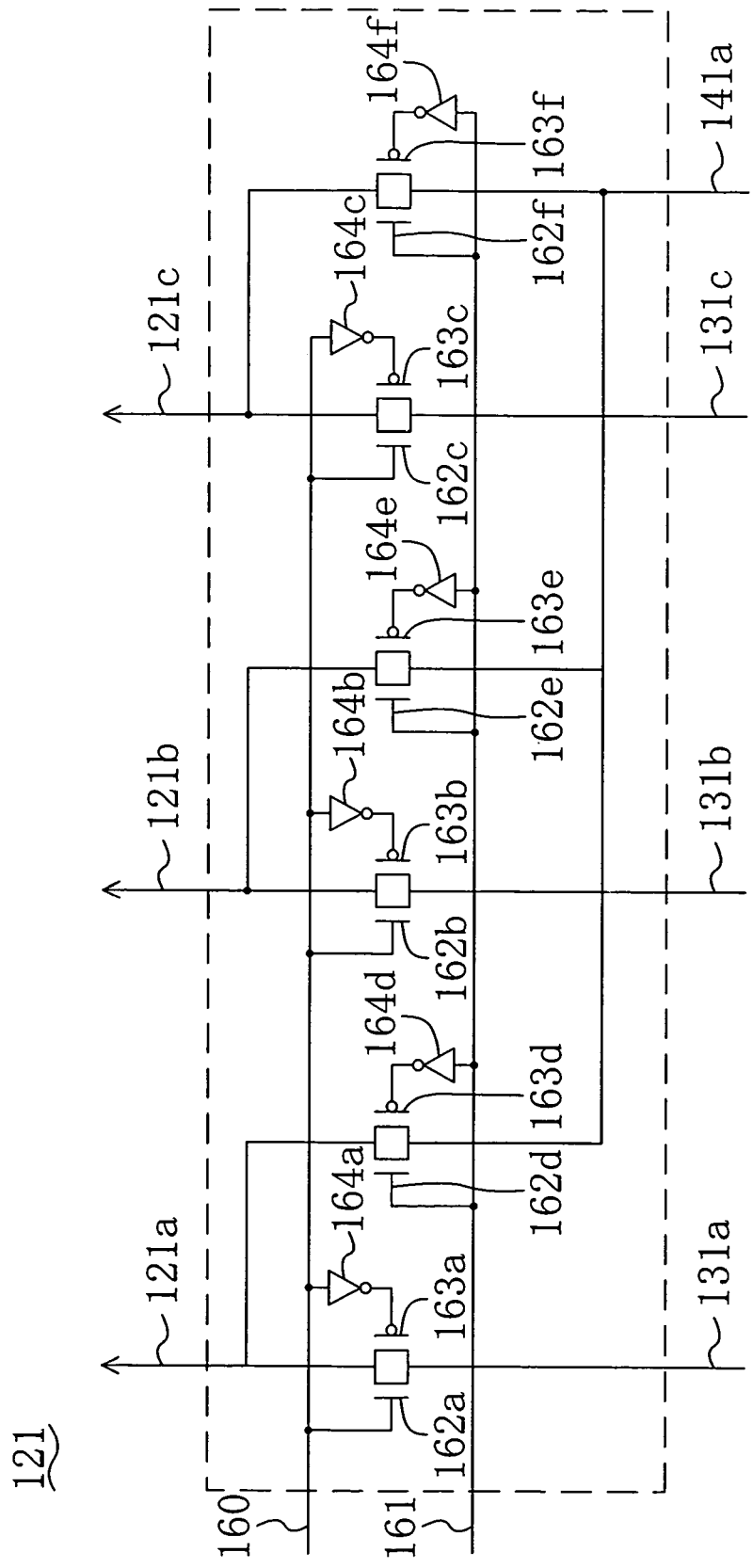
FIG. 8 is a circuit diagram of a selection circuit constituting the column driving circuit in the solid state imaging apparatus of the second embodiment of the present invention.

An exemplary configuration of the selection circuit 120 using a CMOS transistor is shown in FIG. 8. In this case, only the first block 121 in the selection circuit 120 is shown. Each of the other blocks 122 and 123 has an equivalent configuration to that of the first block, and therefore, description thereof will be omitted. As shown in FIG. 8, the first driving signal 131a from the first selection circuit 130 is output as the driving signal 121a via a CMOS transistor including an n-type MOS transistor 162a and a p-type MOS transistor 163a connected in parallel to each other.

In the same manner, the first driving signal 131b from the first selection circuit 130 is output as the driving signal 121b via a CMOS transistor including an n-type MOS transistor 162b and a p-type MOS transistor 163b connected in parallel to each other. The first driving signal 131c is output as the driving signal 121c via a CMOS transistor including an n-type MOS transistor 162c and a p-type MOS transistor 163c connected in parallel to each other.

The second driving signal 141a from the second selection circuit 140 is output as each of the driving signals 121a, 121b and 121c via an associated one of a CMOS transistor including an n-type MOS transistor 162d and a p-type transistor 163d connected in parallel to each other, a CMOS transistor including an n-type MOS transistor 162e and a p-type transistor 163e connected in parallel to each other, and a CMOS transistor including an n-type MOS transistor 162f and a p-type transistor 163f connected in parallel to each other.

The gate of each of the n-type MOS transistors 162d, 162e and 162c is connected to the first selection signal line 160. The gate of each of the p-type MOS transistor 163a, 163b and 163c is connected to the first selection line 160 via an associated one of inverters 164a, 164b and 164c.

The gate of each of the n-type MOS transistors 162d, 162e and 162f is connected to the second selection signal line 161. Each of the p-type MOS transistors 163d, 163e and 163f is connected to the second selection signal line 161 via an associated one of inverters 164d, 164e and 164f.

With this configuration, in a static image mode in which the first selection signal line 160 is the high level and the second selection signal line 161 is the low level, each of the CMOS transistors connected to the first selection signal lines 160 is in a conductive state while each of the CMOS transistors connected to the second selection signal line 161 is in a non-conductive state. Accordingly, for example, the first driving signal 131a from the first driving circuit 130 is output as the driving signal 121a.

On the other hand, in a moving image mode in which the first selection signal line 160 is the low level and the second selection signal line 161 is the high level, each of the CMOS transistors connected to the first selection signal line 160 is in a non-conductive state while each of the CMOS transistors connected to the second selection signal line 161 is in a conductive state. Accordingly, the second driving signal 141a from the second driving circuit 140 is output as each of the driving signal 121a, 121b and 121c to the sensor section 110. Thus, as shown in FIG. 7, three detection signals from the column selection signal lines 111, 112 and 113 are simultaneously output to the detection signal line 105.

As has been described, in the solid state imaging apparatus of the second embodiment, even in a moving image mode, interlaced scanning is not performed, unlike the known solid state imaging apparatus, but detection signals from a plurality of pixel columns are averaged and detected simultaneously. Thus, omission of pixel information can be avoided, so that the occurrence of a false color can be prevented. Therefore, quality of a moving image can be improved.

Third Embodiment

Hereinafter, a third embodiment of the present invention will be described with reference to the accompanying drawings.

In a solid state imaging apparatus according to a third embodiment, major part is the same as that of the second embodiment shown in FIG. 6. The third embodiment is different from the second embodiment in that the selection circuit 120 includes an NMOS transistor, instead of a CMOS transistor, and that the first driving circuit 130 and the second driving circuit 140 are made to perform a master/slave operation.

Figure 9:
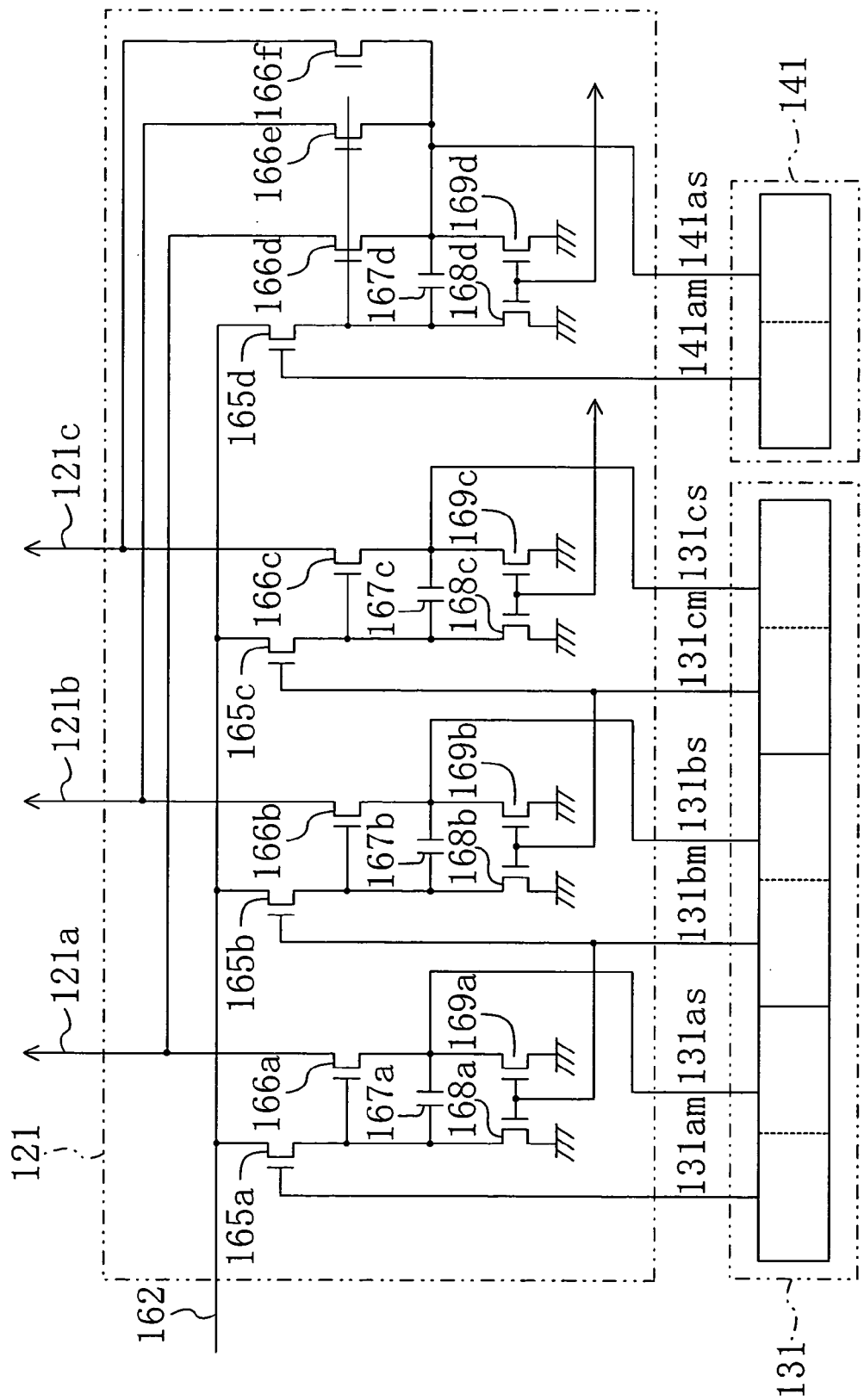
FIG. 9 is a circuit diagram of a selection circuit constituting a column driving circuit in a solid state imaging apparatus according to a third embodiment of the present invention.
Figure 10:
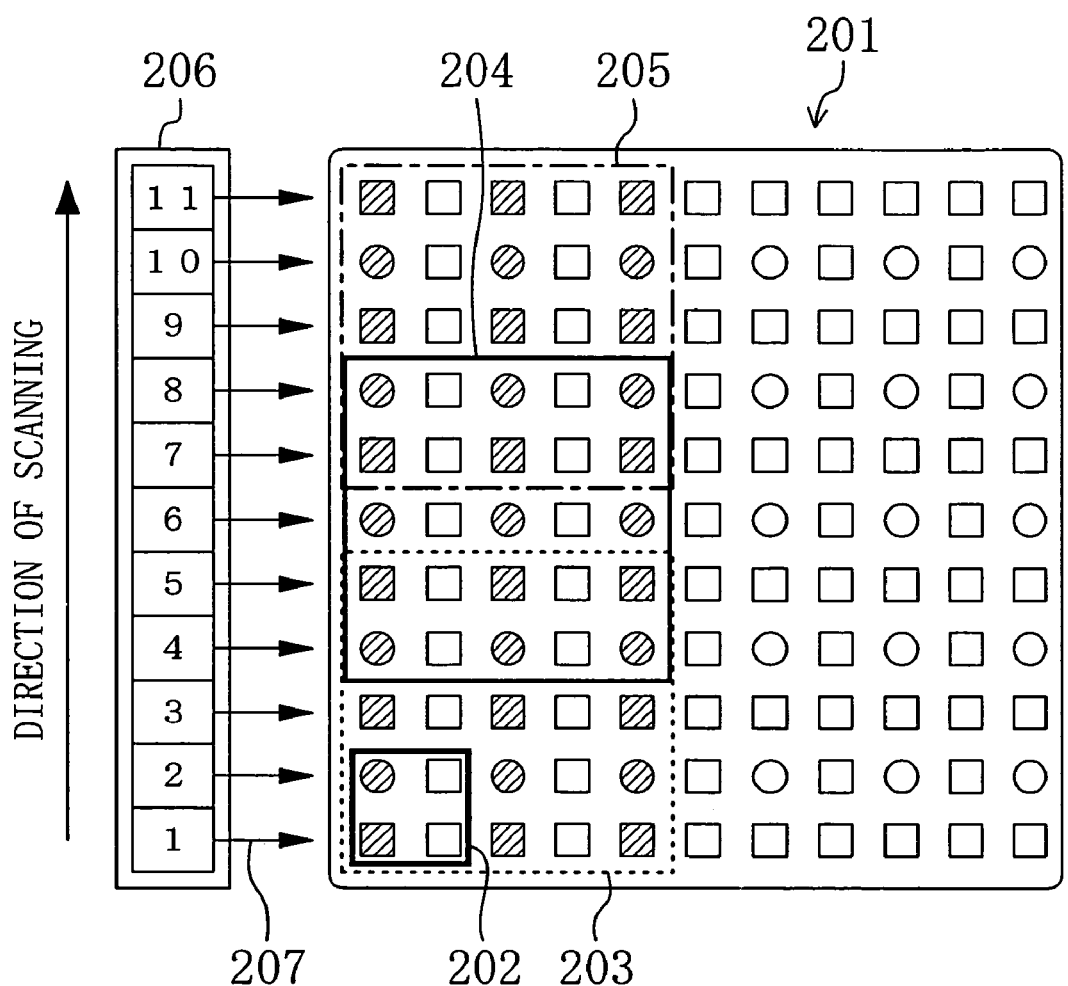
FIG. 10 is a diagram of the configuration of a solid state imaging apparatus according to a first known example.
Figure 11:
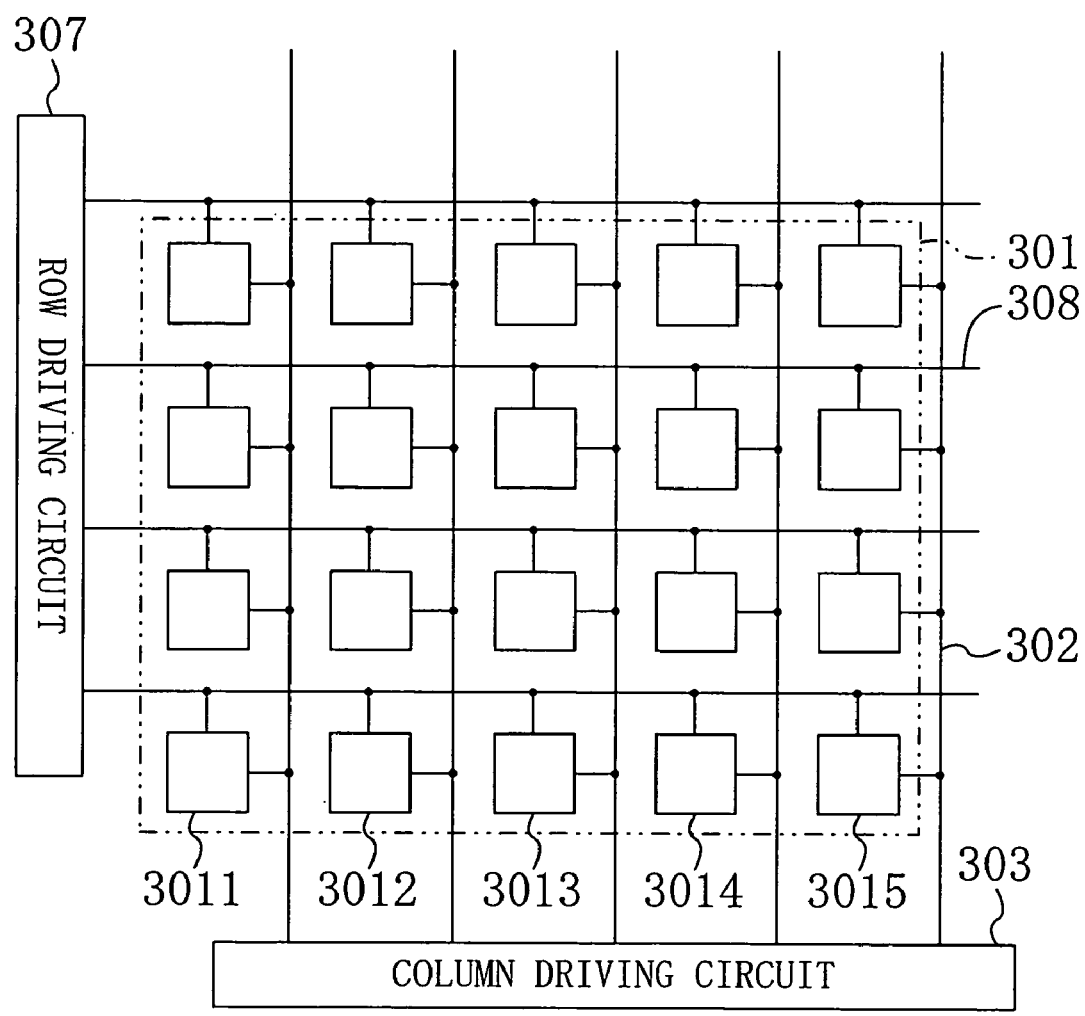
FIG. 11 is a diagram of the configuration of a solid state imaging apparatus according to a second known example.
Figure 12:
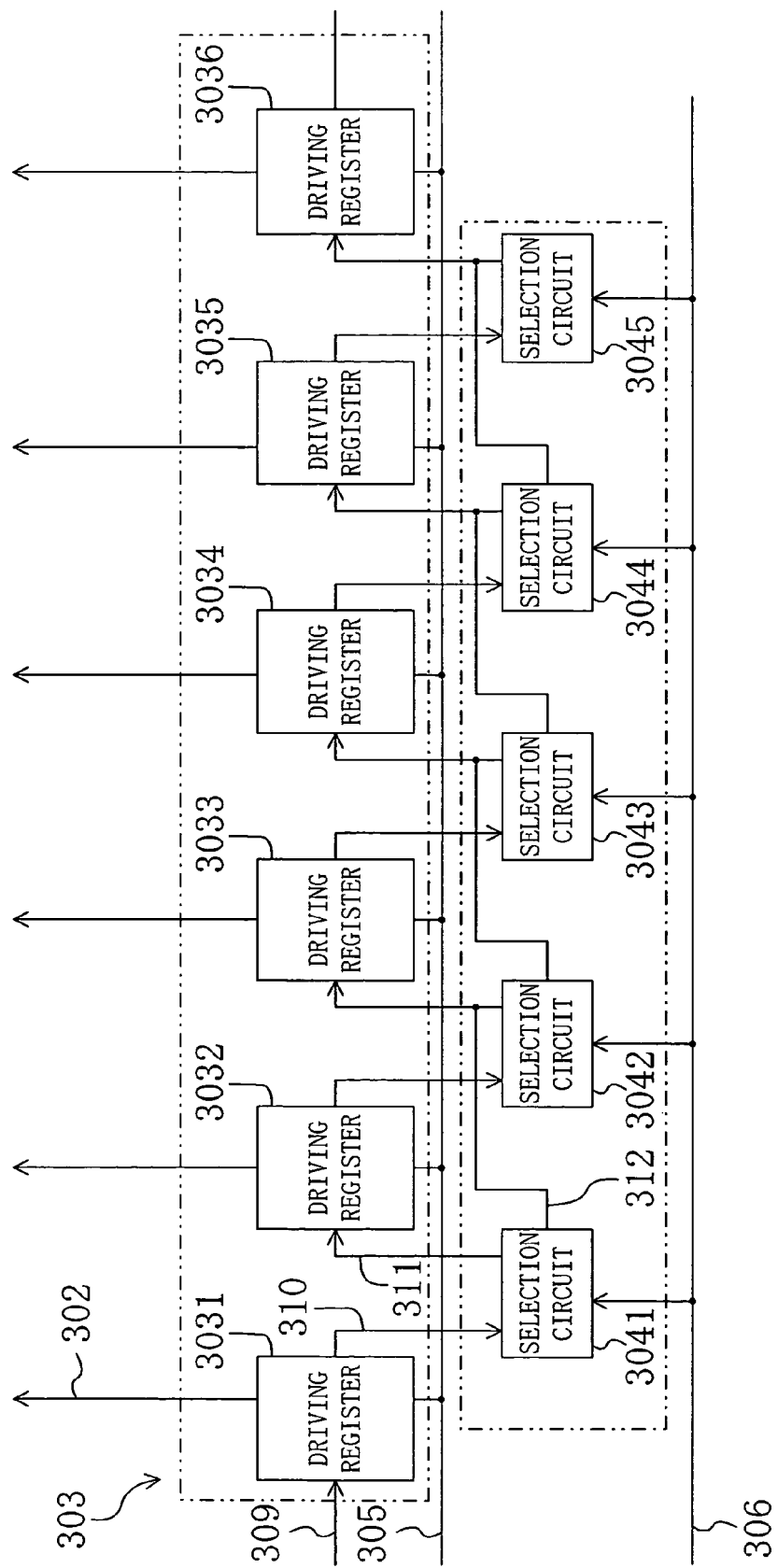
FIG. 12 is a block diagram of a driving circuit in the solid state imaging apparatus of the second known example.

In FIG. 9, only respective first blocks 121, 131 and 141 of a selection circuit 120 using an NMOS transistor, a first driving circuit 130 and a second driving circuit 140 are shown.

As shown in FIG. 9, in the first block 131 of the first driving circuit 130, a first driving signal 131a is divided into a master signal 131am and a slave signal 131as. In the same manner, a first driving signal 131b is divided into a master signal 131bm and a slave signal 131bs, and a first driving signal 131c is divided into a master signal 131cm and a slave signal 131cs.

In the first block 141 of the second driving circuit 140, a second driving signal 141*a* is divided into a master signal 141*am* and a slave signal 141*as*.

The first block 121 of the second driving circuit 120 includes first NMOS transistors 165*a*, 165*b* and 165*c* and second NMOS transistors 166*a*, 166*b* and 166*c*. The respective gates of the first NMOS transistors 165*a*, 165*b* and 165*c* receive the master signal 131*am* from the first block 131 of the first driving circuit 130 and the like, respectively, and the respective drains of the first NMOS transistors 165*a*, 165*b* and 165*c* are connected to the selection signal line 162. The respective gates of the second NMOS transistors 166*a*, 166*b* and 166*c* are connected to the respective sources of the first NMOS transistors 165*a*, 165*b* and 165*c*, respectively, and the respective drains of the second NMOS transistors 166*a*, 166*b* and 166*c* output the driving signal 121*a*, 121*b* and 121*c*, respectively.

Moreover, the first block 121 includes a first NMOS transistor 165*d* and second NMOS transistors 166*d*, 166*e* and 166*f*. The gate of the first NMOS transistor 165*d* receives a master signal 141*am* from the first block 141 of the second driving circuit 140, and a drain thereof is connected to the selection signal line 162. The respective gates of the second NMOS transistors 166*d*, 166*e* and 166*f* are connected to a source of the first NMOS transistor 165*d*, and the respective drains of the second NMOS transistors 166*d*, 166*e* and 166*f* output the driving signal 121*a*, 121*b* and 121*c*, respectively.

Then, capacitors 167*a*, 167*b*, 167*c* and 167*d* are connected between the sources of NMOS transistor 165*a* and the second NMOS transistor 166*a*, between the sources of 165*b* and the second NMOS transistor 166*b*, between the sources of 165*c* and the second NMOS transistor 166*c*, and between the sources of 165*d* and the second NMOS transistor 166*d*, respectively. Each of the capacitors 167*a*, 167*b*, 167*c* and 167*d* generates a predetermined potential difference between sources, i.e., a driving voltage for the second NMOS transistor 166*a*, 166*b*, 166*c* or 166*d*. Moreover, third NMOS transistors 168*a*, 168*b*, 168*c* and 168*d* are connected to the respective sources of the first NMOS transistors 165*a*, 165*b*, 165*c* and 165*d*, respectively, and also fourth NMOS transistors 169*a*, 169*b*, 169*c* and 169*d* are connected to the respective sources of the second NMOS transistors 166*a*, 166*b*, 166*c* and 166*d*, respectively. The respective sources of the first NMOS transistors 165*a*, 165*b*, 165*c* and 165*d* and the second NMOS transistors 166*a*, 166*b*, 166*c* and 166*d* are grounded by the third NMOS transistors 168*a*, 168*b*, 168*c* and 168*d*, respectively, and also by the fourth NMOS transistors 169*a*, 169*b*, 169*c* and 169*d* respectively. Each of the third NMOS transistors 168*a*, 168*b*, 168*c* and 168*d* and the fourth NMOS transistors 169*a*, 169*b*, 169*c* and 169*d* outputs charge of an associated one of the capacitors 167*a*, 167*b*, 167*c* and 167*d*.

A shared gate of the third NMOS transistor 168*a* and the fourth NMOS transistor 169*a* receives the master signal 131*bm* of the first driving signal from the first block 131 of the first driving circuit 130. In the same manner, a shared gate of the third NMOS transistor 168*b* and the fourth NMOS transistor 169*b* receives the master signal 131*cm* of the first driving signal from the first block 131. Moreover, although not shown in FIG. 9, a shared gate of the third NMOS transistor 168*c* and the fourth NMOS transistor 169*c* receives a master signal of the first driving signal from the second block 132 of the first driving circuit 130. Moreover, a shared gate of the third NMOS transistor 168*d* and the fourth NMOS transistor 169*d* receives a master signal of the second driving signal from the second block 142 of the second driving circuit 140.

Hereinafter, the operation of the selection circuit 120 (the first block 121) with the above-described configuration will be described.

First, the first driving circuit 130 (the first block 131) is operated. Then, in a static image mode in which the second driving circuit 140 (the first block 141) is not operated, when the potential of the master signal 131*am* of the first driving signal from the first driving circuit 130 makes a transition to the high level and then the gate of the first NMOS transistor 165*a* is the high level, the first NMOS transistor 165*a* is in a conductive state, so that the voltage of a first terminal of the capacitor 167*a* connected to the source of the first NMOS transistor is the high level due to the selection signal line 162. In this case, the voltage of the slave signal 131*as* from the first driving circuit 130 is the ground level, so that the voltage of a second terminal of the capacitor 167*a* connected to the source of the second NMOS transistor 166*a* is the ground level. Accordingly, the potential of the first terminal of the capacitor 167*a* is increased. Specifically, the gate potential of the second NMOS transistor 166*a* is the high level and then the second NMOS transistor 166*a* is in a conductive state.

Next, when the master signal 131*am* from the first driving circuit 130 makes a transition to the low level and the slave signal 131*as* makes a transition to the high level, the potential transitions are transmitted to the source of the second NMOS transistor 166*a*, so that the drain of the second NMOS transistor 166*a* is the high level. Accordingly, the potential of the column selection line 121*a* is the high level. Thus, a detection signal from the column signal line 111 is output to the detection signal line 105 shown in FIG. 7.

Next, when the master signal 131*bm* form the first driving circuit 130 is the high level and the slave signal 131*bs* is the low level, the second NMOS transistor 166*b* is in a conductive state this time. In this case, the shared gate of the third NMOS transistor 168*a* and the fourth NMOS transistor 169*a* makes a transition to the high level, so that charge charged in the capacitor 167*a* is discharged.

In this manner, the first driving circuit 130 performs sequential scanning to the first block 131, the second block 132 and then the third block 133 and then the driving signals 121*a*, 121*b*, . . . , 123*c* sequentially make a transition to the high level, so that detection signals are sequentially output from the column signal driving lines 111 through 119 to the detection signal line 105.

On the other hand, in a moving image mode in which the first driving circuit 130 (the first block 131) is not operated and the second driving circuit 140 (the first block 141) is operated, the potential of the master signal 141*am* from the second driving circuit 140 makes a transition to the high level and then is applied to the gate of the first NMOS transistor 165*d*, the first NMOS transistor 165*d* is in a conductive state, so that the voltage of a first terminal of the capacitor 167*d* connected to the source of the first NMOS transistor 165*d* is the high level due to the selection signal line 162. In this case, the voltage of the slave signal 141*as* from the second driving circuit 140 is the ground level, so that the voltage of a second terminal of the capacitor 167*d* connected to the sources of the second NMOS transistors 166*d*, 166*e* and 166*f* is the ground level. Accordingly, the potential of the first terminal of the capacitor 167*d* is increased. Specifically, the gate potential of each of the second NMOS transistors 166*d*, 166*e* and 166*f* is the high level and then each of the second NMOS transistors 166*d*, 166*e* and 166*f* is in a conductive state.

Next, when the master signal 141*am* from the second driving circuit 140 makes a transition to the low level and the slave signal 141*as* makes a transition to the high level, the potential transitions are transmitted to the source of each of the second MOS transistors 166*d*, 166*e* and 166*f* and then the drain of each of the second NMOS transistors 166*d*, 166*e* and 166*f* in a conductive state is the high level. Accordingly, the respective potential of the driving signals 121*a*, 121*b* and 121*c* simultaneously become the high level, so that detection signals from the column selection signal lines 111, 112 and 113 are simultaneously output to the detection signal line 105 shown in FIG. 7.

In this manner, the second driving circuit 140 performs sequential scanning to the first block 141, the second block 142, and then the third block 143, and then the column selection signal lines 121*a*, 121*b* and 121*c*, the column selection signal lines 122*a*, 122*b* and 122*c*, and the column selection signal lines 123*a*, 123*b* and 123*c* sequentially make a transition to the high level with three column selection signal lines as a unit. Then, detection signals from every three column selection signal lines, i.e., the column selection signal lines 121*a*, 121*b* and 121*c* are averaged and the averaged detection signals are output.

As has been described, in the solid state imaging apparatus of the third embodiment, even in a moving image mode, instead of performing known interlaced scanning, detection signals from a plurality of pixel columns are averaged and detected simultaneously. Thus, omission of pixel information can be avoided, so that the occurrence of a false color can be prevented. Therefore, quality of a moving image can be improved.

Note that in each of the second and third embodiments, the description has been made using an exemplary configuration in which detection signals by the second driving circuit 140 and from three columns of a plurality of pixel arrays are simultaneously output. However, if the circuit configuration of the selection circuit 120 is changed, detection signals from two or four columns or more can be simultaneously output.

Moreover, in each of the second and third embodiments, column selection signals for selecting a pixel array arranged in the column direction from pixels arranged in both of the row direction and column direction have been described. However, the present invention may be applied to the case in which row selection signals for selecting a pixel array arranged in the row direction.

Moreover, by configuring a camera using one of the solid state imaging apparatuses of the first through third embodiments, a camera in which the occurrence of a false color due to omission of pixel information is prevented even in a moving image pickup mode and decrease in image quality is reduced can be achieved.

In this manner, the present invention is suitable for a MOS type solid state imaging apparatus used in a digital camera and the like. More specifically, the present invention is suitable for a MOS type solid state imaging apparatus used in a camera built in a cellular phone, a digital still camera, a camera unit to be connected to an information processing instrument and the like.

What is claimed is:

1. A solid state imaging apparatus, comprising:
    a plurality of pixels two-dimensionally arranged in a vertical direction and a horizontal direction wherein each of the plurality of pixels has a color filter having a different color from color filters of vertically or horizontally adjacent pixels; and
    a signal output circuit configured to perform one of two types of operations,
    wherein the signal output circuit includes:
    a shift register for sequentially outputting selection signals, which drive each pixel, to all of the plurality of pixels either in a vertical or a horizontal direction, and
    an operation switching circuit for outputting the selection signals from the shift register to each pixel, the operation switching circuit configured to switch between a first signal transmission method in which the selection signals are sequentially output to all pixels either in the vertical direction or the horizontal direction and a second signal transmission method in which the selection signals are continuously output to pixels having color filters of the same color either in the vertical direction or the horizontal direction, and
    wherein in both of the first and second signal transmission methods, each of the selection signals of the shift register is output via the operation switching circuit to a corresponding pixel included in the same pixel group arranged in the same direction as the shift register, such that all pixels in the pixel group receive a selection signal from the shift register in the first signal transmission method and all pixels in the pixel group receive a selection signal from the shift register in the second signal transmission method.

2. The solid state imaging apparatus of claim 1, wherein the second signal transmission method repeats, after continuously outputting signals of the plurality of pixels having color filters of the same color, an operation which continuously outputs signals of the plurality of pixels having color filters of a different color, on a basis of a pixel mixture unit consisting of a plurality of pixels, and
    the pixel mixture unit consists of 25 pixels arranged in five rows and five columns.

3. The solid state imaging apparatus of claim 1, wherein the first signal transmission method is a sequential scanning method, and the second signal transmission method is a pixel mixture scanning method.

4. The solid state imaging apparatus of claim 3, wherein a static image mode is executed by the sequential scanning method, and a moving image mode is executed by the pixel mixture scanning method.

5. The solid state imaging apparatus of claim 1, wherein the solid state imaging apparatus is of a MOS type, and the operation switching circuit comprises a plurality of MOS transistors selected by a plurality of gate signal lines.

6. The solid state imaging apparatus of claim 1, wherein the first signal transmission method sequentially outputs all the pixel signals having color filters of the different colors from one another.

7. The solid state imaging apparatus of claim 1, wherein in the first signal transmission method, the shift register outputs the selection signals in number order, and in the second signal transmission method, the shift register outputs the selection signals, changing the order partially.

8. The solid state imaging apparatus of claim 1, wherein the second signal transmission method outputs signals of all of the pixels without thinning.

9. The solid state imaging apparatus of claim 1, wherein the solid state imaging apparatus is a MOS type solid state imaging apparatus, and
    a MOS transistor is used in the shift register.

10. A solid state imaging apparatus, comprising:
    a plurality of pixels arranged two-dimensionally wherein each of the plurality of pixels has a color filter having a different color from color filters of adjacent pixels in a row or a column;
    a shift register for outputting selection signals, which drive each pixel, to a single line pixel group of the plurality of pixels; and an operation switching circuit for switching between two signal transmission methods when outputting the selection signals from the shift register to the single line pixel group, wherein in the first signal transmission method of the two signal transmission methods, the operation switching circuit outputs the selection signals without changing an order of the selection signals, and in the second signal transmission method of the two signal transmission methods, the operation switching circuit outputs the selection signals, changing the order of the selection signals partially, and in both of the first and second signal transmission methods, each of the selection signals of the shift register is output via the operation switching circuit to a corresponding pixel included in the same single line pixel group, such that all pixels in the single line pixel group receive a selection signal from the shift register in the first signal transmission method and all pixels in the single line pixel group receive a selection signal from the shift register in the second signal transmission method.

11. The solid state imaging apparatus of claim 10, wherein and the second signal transmission method provides a second operation continuously outputting selection signals to the pixels included in the single line pixel group and having color filters of a same color.

12. The solid state imaging apparatus of claim 10, wherein the second signal transmission method outputs signals of all of the pixels included in the single line pixel group without thinning.

13. The solid state imaging apparatus of claim 10, wherein the solid state imaging apparatus is a MOS type solid state imaging apparatus, and a MOS transistor is used in the shift register.

* * * * *